US012323761B2

(12) United States Patent
Jiang et al.

(10) Patent No.: US 12,323,761 B2
(45) Date of Patent: Jun. 3, 2025

(54) ELECTRONIC DEVICE WITH SOUND GUIDING CHANNEL

(71) Applicant: VIVO MOBILE COMMUNICATION CO., LTD., Dongguan (CN)

(72) Inventors: Guozhu Jiang, Dongguan (CN); Wei Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 257 days.

(21) Appl. No.: 17/975,575

(22) Filed: Oct. 27, 2022

(65) Prior Publication Data

US 2023/0051986 A1 Feb. 16, 2023

Related U.S. Application Data

(63) Continuation of application No. PCT/CN2021/076913, filed on Feb. 19, 2021.

(30) Foreign Application Priority Data

Apr. 29, 2020 (CN) ........................ 202010359500.X

(51) Int. Cl.
*H04R 1/40* (2006.01)
*H04R 3/12* (2006.01)

(52) U.S. Cl.
CPC ............... *H04R 1/403* (2013.01); *H04R 3/12* (2013.01)

(58) Field of Classification Search
CPC ....... H04R 1/403; H04R 3/12; H04R 2499/15
(Continued)

(56) References Cited

U.S. PATENT DOCUMENTS

| | | | | |
|---|---|---|---|---|
| 2005/0207590 | A1 | 9/2005 | Niehoff et al. | |
| 2007/0071259 | A1* | 3/2007 | Tojo | H04R 1/323 381/388 |
| 2014/0203684 | A1* | 7/2014 | Yamamoto | B06B 1/0618 310/322 |

FOREIGN PATENT DOCUMENTS

| | | |
|---|---|---|
| CN | 102811406 A | 12/2012 |
| CN | 105101004 A | 11/2015 |

(Continued)

OTHER PUBLICATIONS

International Search Report issued in corresponding International Application No. PCT/CN2021/076913, mailed May 19, 2021, 6 pages.

(Continued)

*Primary Examiner* — Vivian C Chin
*Assistant Examiner* — Douglas J Suthers
(74) *Attorney, Agent, or Firm* — IPX PLLC

(57) ABSTRACT

An electronic device is provided. The electronic device includes a device body, a first sound-emitting component, and a second sound-emitting component. the first sound-emitting component and the second sound-emitting component are both disposed in the device body. The first sound-emitting component emits a first ultrasonic wave The second sound-emitting component emits a second ultrasonic wave. A frequency of the first ultrasonic wave is different from that of the second ultrasonic wave. A first sound guide channel and a second sound guide channel are disposed in the device body. A first sound guide hole and a second sound guide hole are disposed at an outer surface of the device body. The first sound-emitting component is connected to the first sound guide hole through the first sound guide channel. The second sound-emitting component is connected to the second sound guide hole through the second sound guide channel.

11 Claims, 4 Drawing Sheets

(58) Field of Classification Search
USPC .................................. 381/98, 306, 388, 333
See application file for complete search history.

(56) References Cited

FOREIGN PATENT DOCUMENTS

| | | | |
|---|---|---|---|
| CN | 105308677 | A | 2/2016 |
| CN | 205946136 | U | 2/2017 |
| CN | 108173997 | A | 6/2018 |
| CN | 209448766 | U | 9/2019 |
| CN | 111754856 | A | 10/2020 |
| EP | 3471434 | A1 | 4/2019 |
| JP | 2012034124 | A | 2/2012 |
| WO | 2013114498 | A1 | 8/2013 |
| WO | 2014054784 | A1 | 4/2014 |

OTHER PUBLICATIONS

First Office Action issued in related Chinese Application No. 202010359500.X mailed Mar. 3, 2022, 8 pages.
Extended European Search Report issued in related European Application No. 21795495.7, mailed Sep. 29, 2023, 8 pages.
Olszewski Disk et al: “Stark gerichtete Audio-Beschallung mit parametrischem Ultraschall-Lautsprecher Zur Erlangung des akademischen Grades”, XP093083896, Jul. 16, 2008.

* cited by examiner

ELECTRONIC DEVICE WITH SOUND GUIDING CHANNEL

CROSS-REFERENCE TO RELATED APPLICATIONS

The application is a continuation of International Application No. PCT/CN2021/076913, filed on Feb. 19, 2021, which claims priority to Chinese Patent Application No. 202010359500.X, filed on Apr. 29, 2020. The entire contents of each of the above-referenced applications are expressly incorporated herein by reference.

TECHNICAL FIELD

The present disclosure relates to the field of audio technologies, and in particular to an electronic device.

BACKGROUND

With the rapid development of electronic devices, the electronic devices are applied increasingly widely, for example, mobile phones, tablet computers, and the like play a growing number of roles in people's work, life, entertainment, and the like.

At present, speakers and telephone receivers of the electronic devices amplify audio signals and then drive the air through sound film to make sound. A frequency range of sound audible to human ears is 20 Hz-20 kHz. Since a sound wave of the audible sound propagates in the air with no obvious directivity, the sound propagates in all directions around, which further causes the sound to be heard by more people. When people use the electronic devices to play music, watch videos, or perform video chat, it is easy to affect others. Therefore, people expect that the electronic devices can achieve directional delivery of the sound.

SUMMARY

The present application discloses an electronic device.

The present disclosure is implemented as follows.

According to a first aspect, an embodiment of the present disclosure discloses an electronic device, including a device body, a first sound-emitting component, and a second sound-emitting component, where the first sound-emitting component and the second sound-emitting component are both disposed in the device body, the first sound-emitting component emits a first ultrasonic wave, the second sound-emitting component emits a second ultrasonic wave, a frequency of the first ultrasonic wave is different from that of the second ultrasonic wave, a first sound guide channel and a second sound guide channel are disposed in the device body, a first sound guide hole and a second sound guide hole are disposed at an outer surface of the device body, the first sound-emitting component is connected to the first sound guide hole through the first sound guide channel, and the second sound-emitting component is connected to the second sound guide hole through the second sound guide channel.

BRIEF DESCRIPTION OF DRAWINGS

To describe the embodiments of the present disclosure or in the background art more clearly, the drawings required for describing the embodiments or the background art are described briefly below. Obviously, other drawings can be obtained by those of ordinary skill in the art based on these drawings without creative efforts.

DETAILED DESCRIPTION

To make the present disclosure clearer, the following describes the present disclosure with reference to embodiments of the present disclosure and corresponding accompanying drawings. Apparently, the described embodiments are merely some rather than all of the embodiments of the present disclosure. Based on the embodiments of the present disclosure, all other embodiments obtained by a person of ordinary skill in the art without creative efforts fall within the protection scope of the present disclosure.

The embodiments of the present disclosure are described in detail below with reference to the accompanying drawings.

Figure 1:
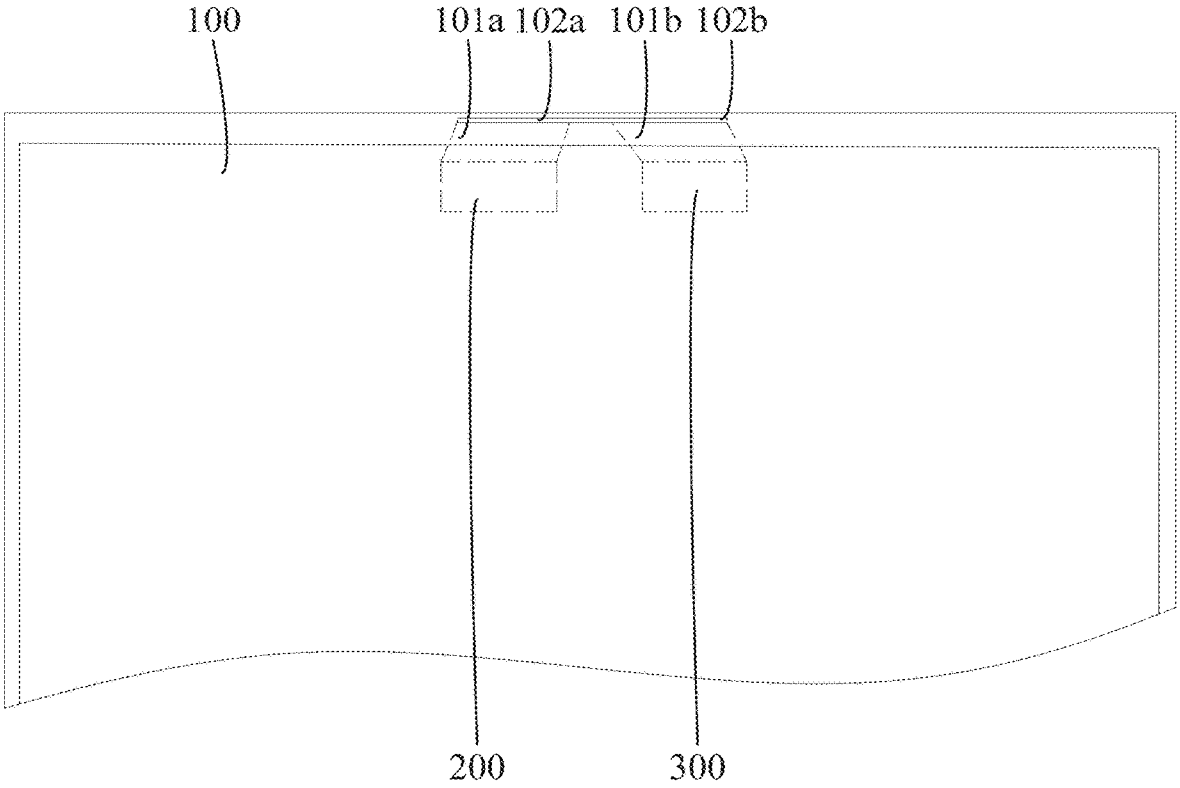
FIG. 1 is a structural schematic diagram of an electronic device according to an embodiment of the present disclosure.
Figure 2:
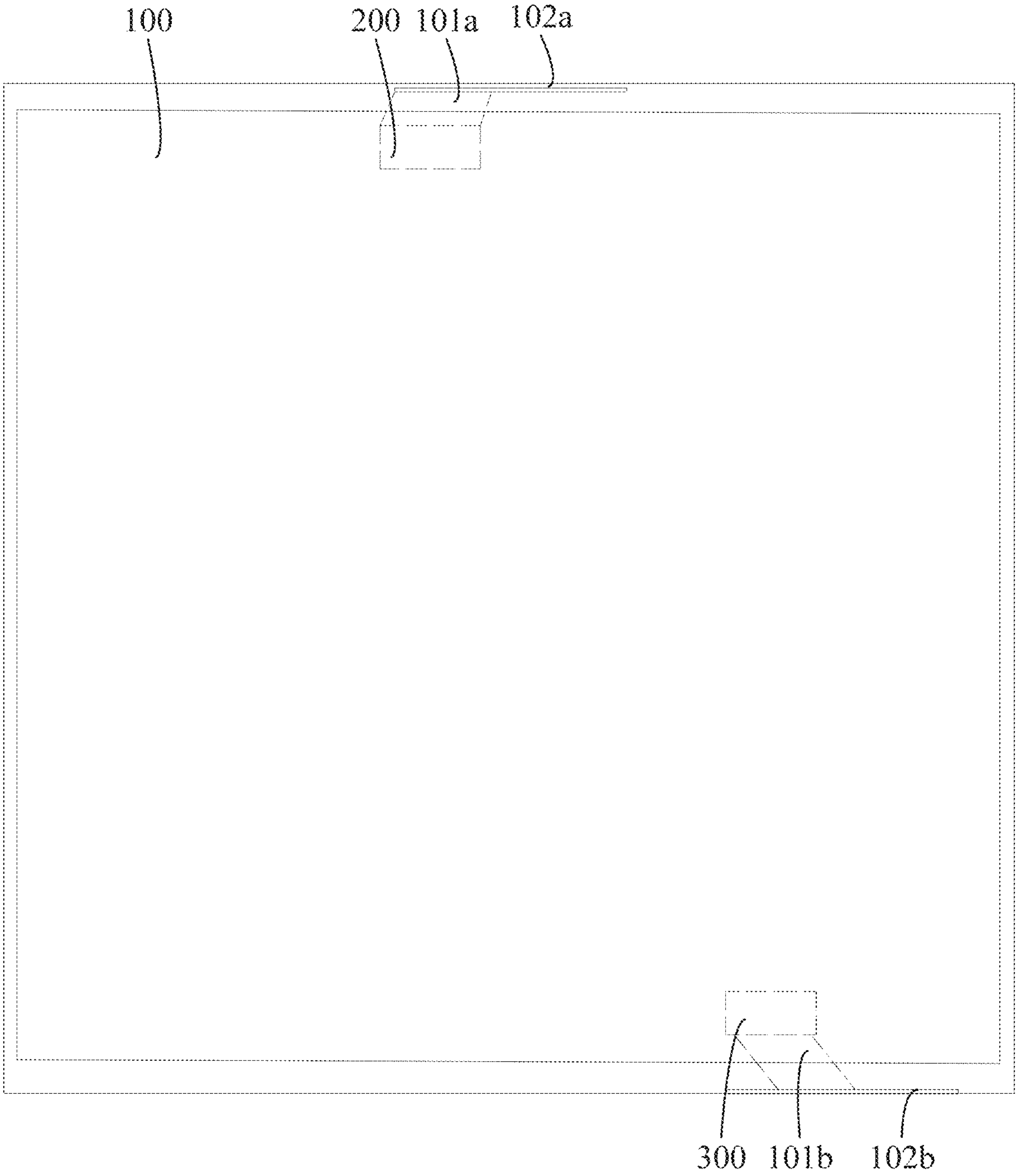
FIG. 2 is another structural schematic diagram of the electronic device according to an embodiment of the present disclosure.
Figure 3:
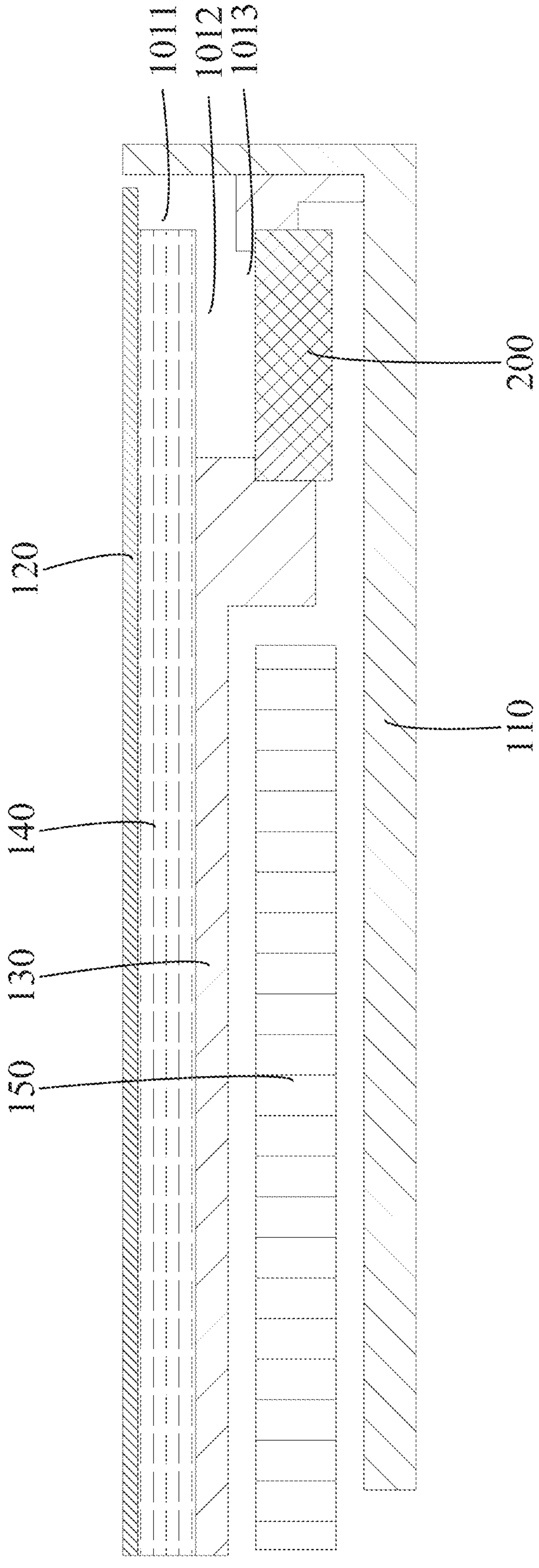
FIG. 3 is a cross-sectional view of the electronic device according to an embodiment of the present disclosure.
Figure 4:
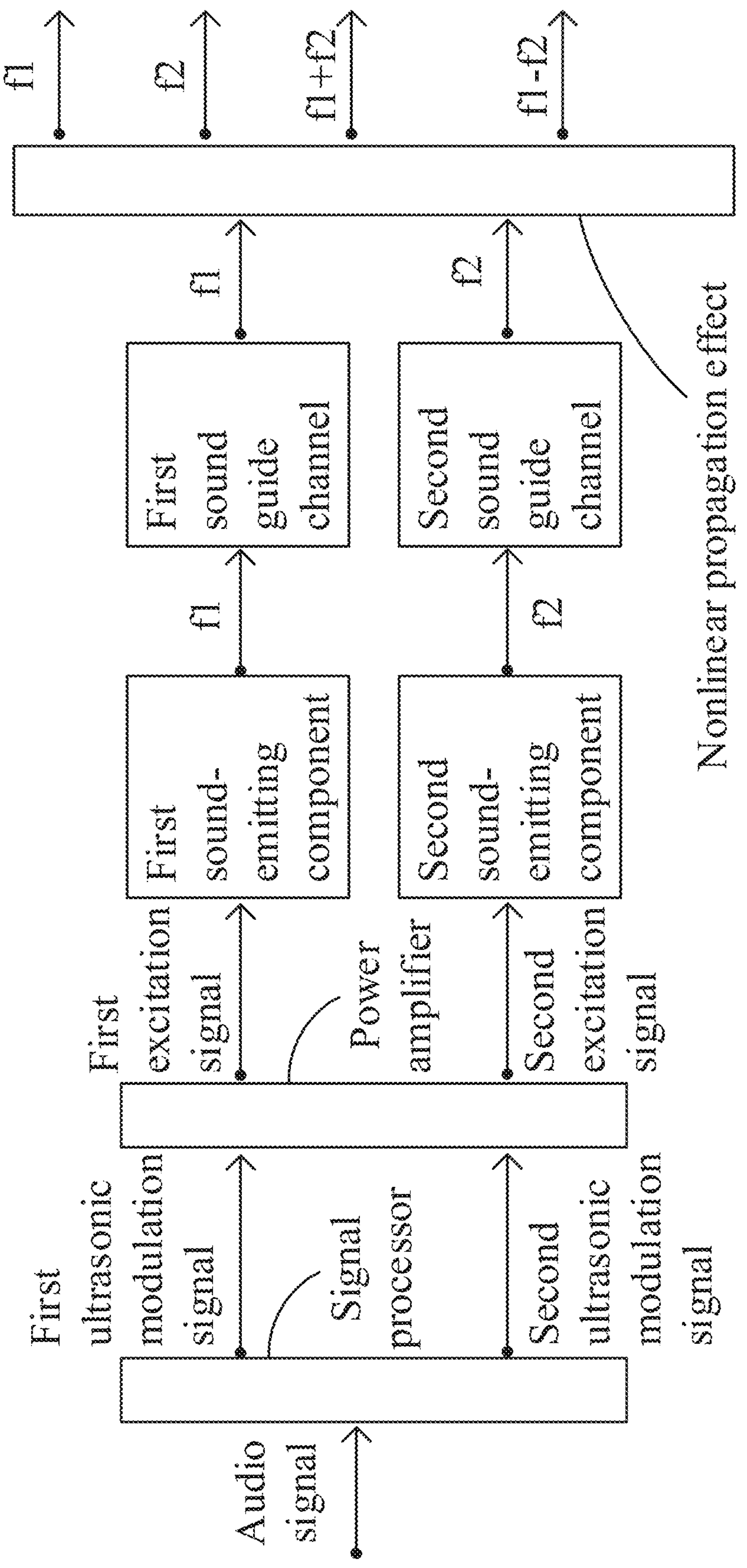
FIG. 4 is a block diagram of modulation and demodulation of an audio signal of the electronic device according to an embodiment of the present disclosure.

Referring to FIG. 1 to FIG. 4, embodiments of the present disclosure disclose an electronic device. The disclosed electronic device includes a device body 100, a first sound-emitting component 200, and a second sound-emitting component 300.

The electronic device disclosed in the embodiments of the present disclosure includes the device body 100. The device body 100 is a main part of the electronic device, and the device body 100 may include main functional components of the electronic device, such as a display screen and a motherboard 150.

The first sound-emitting component 200 and the second sound-emitting component 300 are both disposed in the device body 100. The first sound-emitting component 200 emits a first ultrasonic wave, and the second sound-emitting component 300 emits a second ultrasonic wave. A frequency of the first ultrasonic wave is different from that of the second ultrasonic wave. A first sound guide channel **101*a* and a second sound guide channel 101*b* are disposed in the device body 100. A first sound guide hole 102*a* and a second sound guide hole 102*b* are disposed at an outer surface of the device body 100. The first sound-emitting component 200 is connected to the first sound guide hole 102*a* through the first sound guide channel 101*a*. The second sound-emitting component 300 is connected to the second sound guide hole 102*b* through the second sound guide channel 101*b***.

In an operation process, a signal processor and a power amplifier are disposed in the device body 100. The signal processor can modulate an audio signal of the electronic device into a first ultrasonic carrier signal and a second ultrasonic carrier signal. After the first ultrasonic carrier signal and the second ultrasonic carrier signal are amplified by the power amplifier, a first excitation signal and a second excitation signal are obtained. The first excitation signal is applied to the first sound-emitting component 200 to excite the first ultrasonic wave. The second excitation signal is applied to the second sound-emitting component 300 to excite second ultrasonic wave. The first ultrasonic wave is transmitted to the outside of the electronic device through the first sound guide channel 101*a* and the first sound guide hole 102*a*. The second ultrasonic wave is transmitted to the outside of the electronic device through the second sound guide channel 101*b* and the second sound guide hole 102*b*. During transmission of the first ultrasonic wave and the second ultrasonic wave, due to nonlinear demodulation of the air, the first ultrasonic wave and the second ultrasonic wave form audible sound waves. Frequencies of the first ultrasonic wave and the second ultrasonic wave are selected properly, so that a difference-frequency sound wave of the two ultrasonic waves may be an audible sound wave.

For example, a frequency of the first ultrasonic wave may be f1, and a frequency of the second ultrasonic wave may be f2. Due to nonlinear interaction of air, the first ultrasonic wave and the second ultrasonic wave are demodulated as f1, f2, f1+f2, f1−f2, 2f1, 2f2, and the like, where f1−f2 is the difference-frequency sound wave. Frequencies of f1 and f2 are selected properly, so that f1 and f2 are audible sound waves. For example, f1=31 kHz, f2=30 kHz, f1−f2=1 kHz, and a sound wave at a frequency of 1 kHz belongs to an audible sound wave. In some embodiments, the first sound-emitting component 200 and the second sound-emitting component 300 may be speakers or telephone receivers, which are not limited herein.

In an embodiment of the present disclosure, the first ultrasonic wave and the second ultrasonic wave can be directionally propagated in the air through strong directivity of the ultrasonic wave. In addition, due to nonlinear demodulation of the air, a difference-frequency sound wave is demodulated in the air. The generated difference-frequency sound wave is audible to a human ear and has strong directivity, so that sound can be propagated to a designated area and is not easily heard in other areas. Therefore, the sound emitted by the electronic device can be directionally delivered to a designated location. In this embodiment of the present disclosure, that the first ultrasonic wave and the second ultrasonic wave are demodulated through air to form a difference-frequency sound wave are well-known technologies, and details are not described herein again.

In an embodiment of the present disclosure, a user can adjust sound emitting directions of the first sound-emitting component 200 and the second sound-emitting component 300, so that the sound emitting directions of the first sound-emitting component 200 and the second sound-emitting component 300 face the user. In this case, sound emitted by the electronic device through the first sound-emitting component 200 and the second sound-emitting component 300 can be directionally propagated to a location where the user is located. Therefore, the sound is not easily propagated to a surrounding environment, so as to avoid affecting the surrounding environment and thus not easily affect other people.

In addition, because the first ultrasonic wave and the second ultrasonic wave are respectively emitted by two independent sound-emitting components, a vibrating diaphragm of the first sound-emitting component 200 and a vibrating diaphragm of the second sound-emitting component 300 work independently, and the vibrating diaphragm of the first sound-emitting component 200 and the vibrating diaphragm of the second sound-emitting component 300 generate only one vibration frequency, so as to ensure that the two sound-emitting components do not interfere with each other during sound emitting through vibration. Therefore, distortion of mutual demodulation between the first ultrasonic wave and the second ultrasonic wave can be prevented, and reliability of audio transmission of the electronic device can be further improved.

In another embodiment, the first sound-emitting component 200 and the second sound-emitting component 300 may also directly emit audible sound. In this case, the audible sound emitted by the first sound-emitting component 200 and the second sound-emitting component 300 has no directivity. Therefore, sound from the electronic device can be played through a speaker. In this case, the electronic device can emit both directional audible sound and non-directional audible sound, so that an audio playback effect of the electronic device can be improved.

In an embodiment, a resonant frequency of the first sound-emitting component 200 and a resonant frequency of the second sound-emitting component 300 are different, and the resonant frequencies of the sound-emitting components are determined by a material and shape of the sound-emitting components. Therefore, the first sound-emitting component 200 and the second sound-emitting component 300 may be made of different materials, and the first sound-emitting component 200 and the second sound-emitting component 300 may also be made into different shapes. The resonant frequency of the first sound-emitting component 200 and the resonant frequency of the second sound-emitting component 300 may be within or approximate to an ultrasonic frequency band. Materials of vibrating diaphragms of the first sound-emitting component 200 and the second sound-emitting component 300 are relatively hard, and domes of the vibrating diaphragms and voice coils have relatively light textures.

A frequency of the first ultrasonic wave may be the same as a resonant frequency of the first sound-emitting component 200. In this case, a working frequency of the first sound-emitting component 200 is at the resonance frequency, so that the first sound-emitting component 200 has relatively high electro-acoustic conversion efficiency, and a sound-emitting power of the first ultrasonic wave is also relatively great.

Similarly, it can be known that a frequency of the second ultrasonic wave may also be the same as a resonant frequency of the second sound-emitting component 300, so that the second sound-emitting component 300 has relatively great electro-acoustic conversion efficiency, and a sound-emitting power of the second ultrasonic wave is also relatively great.

In an embodiment, the first sound-emitting component 200 and the second sound-emitting component 300 may be located at the same end of the device body 100. In this case, the first sound guide hole 102*a* is connected to the second sound guide hole 102*b* to form one sound guide hole. The number of holes at the electronic device can be reduced, thereby improving integrity of the device body 100 and waterproof performance and dustproof performance of the electronic device.

In another embodiment, the first sound guide channel 101*a* may also be connected to the second sound guide channel 101*b* to form one sound guide channel. In this case, the first ultrasonic wave and the second ultrasonic wave can be transmitted to the outside of the electronic device through a same sound guide channel, so that a quantity of sound guide channels to be processed can be reduced, thereby reducing processing steps for the electronic device, and making the electronic device manufactured easily.

When a distance between the first sound-emitting component 200 and the second sound-emitting component 300 is relatively long, a distance between the first sound guide channel 101*a* and the second sound guide channel 101*b* is relatively long, so that a great energy loss of the first ultrasonic wave and the second ultrasonic wave is caused, and then formed audible sound is propagated for a short distance. In another embodiment, the distance between the first sound-emitting component 200 and the second sound-emitting component 300 is less than 20 mm. In this case, the distance between the first sound-emitting component 200 and the second sound-emitting component 300 is relatively short, the distance between the first sound guide channel 101*a* and the second sound guide channel 101*b* can be set relatively short, and a distance for propagating the first ultrasonic wave in the first sound guide channel 101*a* is relatively short, and a distance for propagating the second ultrasonic wave in the second sound guide channel 101*b* is relatively short. As a result, less energy loss of the first ultrasonic wave and the second ultrasonic wave is caused, so that distances for propagating the first ultrasonic wave and the second ultrasonic wave are relatively long, and then a distance for propagating the audible sound is relatively long.

In another embodiment, the first sound-emitting component 200 and the second sound-emitting component 300 may be respectively located at two ends of the device body 100, the first sound guide channel 101*a* and the second sound guide channel 101*b* are respectively disposed at the two ends of the device body 100, and the first sound guide hole 102*a* and the second sound guide hole 102*b* are respectively disposed at the two ends of the device body 100. The two ends of the device body 100 may be a top end and a bottom end of the device body 100. The first sound-emitting component 200 may be connected to the first sound guide hole 102*a* through the first sound guide channel 101*a*, and the first ultrasonic wave is emitted from a top of the electronic device. The second sound-emitting component 300 may be connected to the second sound guide hole 102*b* through the second sound guide channel 101*b*, and the second ultrasonic wave is emitted from a bottom end of the electronic device. Since the top of the device body 100 is usually provided with components such as a sensor and a camera module, available space at the top is relatively small. It is inconvenient to set two sound-emitting components at the top of the device body 100, so the first sound-emitting component 200 and the second sound-emitting component 300 may be respectively located at the two ends of the device body 100. The first sound-emitting component 200 may be disposed at the top of the device body 100, the second sound-emitting component 300 may be disposed at the bottom of the device body 100, and a position at the bottom of the device body 100 may be utilized for the second sound-emitting component 300. Therefore, the electronic device can be provided with two sound-emitting components without change of layouts of other components, so that the electronic device has a simple structure and is easily to manufacture.

In some embodiments, the first sound-emitting component 200 and the second sound-emitting component 300 may be disposed in a staggered manner, and the first sound-emitting component 200 and the second sound-emitting component 300 may also be distributed along a straight line.

In addition, in a case that the first sound-emitting component 200 and the second-emitting component 300 are respectively disposed at the top and the bottom of the device body 100, the distance between the first sound-emitting component 200 and the second sound-emitting component 300 is relatively long, so that the first sound-emitting component 200 and the second sound-emitting component 300 can form a binary sound-emitting component array. An intersection between the first ultrasonic wave and the second ultrasonic wave may be in a center direction of the electronic device, so that a stereo effect of the electronic device can be achieved, thereby forming relatively good sound quality for the electronic device.

Definitely, embodiments of the present disclosure are not limited to the first sound-emitting component 200 and the second sound-emitting component 300, and multiple sound-emitting components may be provided, and the multiple sound-emitting components form a multi-element array, thereby further improving the sound quality of the electronic device.

In the foregoing embodiment, the device body 100 may include a housing 110, and a surface of the housing 110 may be provided with a sound guide hole 102. In this case, the sound guide hole 102 destroys integrity of the housing 110, making the appearance of the electronic device less consistent, and the electronic device has poor water resistance and dust resistance, thereby reducing safety and reliability of the electronic device. Therefore, in an embodiment, the device body 100 may include the housing 110 and a first functional module, and the first sound-emitting component 200 and the second sound-emitting component 300 may both be disposed in the housing 110. An assembly gap between the housing 110 and the first functional module may form the first sound guide hole 102*a* or the second sound guide hole 102*b*, or both the first sound guide hole 102*a* and the second sound guide hole 102*b* are formed by the assembly gap between the housing 110 and the functional module. The assembly gap is formed between the housing 110 and the first functional module after assembly. Therefore, the ultrasonic wave can be transmitted through the assembly gap between the first functional module and the housing 110, so that there is no need to dispose a sound guide hole at the housing 110, thereby reducing the number of holes at the housing 110. Therefore, integrity and appearance consistency of the housing 110 is improved, so that relatively good appearance and texture of the housing 110 can be provided, and user experience can be improved. In addition, the sound guide hole formed by the assembly gap between the housing 110 and the first functional module is narrower than the sound guide hole disposed at the housing 110, so that less water vapor and dust in the environment can be effectively prevented from entering the housing 110, thereby improving the waterproof performance and dustproof performance of the electronic device.

The first functional module may be a camera module, a fingerprint recognition module, and the like. Definitely, the first functional module may also be a decorative part of the camera module, the fingerprint recognition module, and the like. The first functional module may also be another functional module, and a specific structure of the first functional module is not limited herein.

In another embodiment, the first functional module may include a light-transmitting cover plate 120. The light-transmitting cover plate 120 and the housing 110 may enclose accommodating space. The first sound-emitting component 200 and the second sound-emitting component 300 are both located in the accommodating space. An assembly gap between the housing 110 and the light-transmitting cover plate 120 forms the first sound guide hole 102*a* or the second sound guide hole 102*b*. In some alternative embodiments, the first sound guide hole 102*a* and the second sound guide hole 102*b* are both formed by the assembly gap between the housing 110 and the light-transmitting cover plate 120. The assembly gap between the light-transmitting cover plate 120 and the housing 110 is located at an edge of the device body 100, and the formed sound guide hole is more concealed, bringing a relatively weak visual impact to the user and further improving user experience.

In the foregoing embodiment, the dust and water vapor in the external environment may enter the device body 100 along the first sound guide hole 102*a* and the second sound guide hole 102*b*, so that sound outlets of the first sound-emitting component 200 and the second sound-emitting component 300 may be blocked or electronic parts and components may be short-circuited, resulting in damage to the first sound-emitting component 200 and the second sound-emitting component 300, and reducing safety and reliability of the electronic device.

The present disclosure provides a structure of the first sound guide channel 101*a*, which may be another structure and is not limited herein. In some embodiments, the first sound guide channel 101*a* may include a first sound guide segment 1011, a second sound guide segment 1012, and a third sound guide segment 1013 connected in sequence, and the first sound guide segment 1011 may be connected to the first sound guide hole 102*a*. The first sound guide segment 1011 of the first sound guide channel 101*a* is connected to the first sound guide hole 102*a*, and a specific structure of the first sound guide channel 101*a* is not limited herein.

The first sound-emitting component 200 is located at an end of the third sound guide segment 1013 away from the second sound guide segment 1012. A central axis of the first sound guide segment 1011 intersects with a central axis of the second sound guide segment 1012, and a central axis of the first sound guide segment 1011 is parallel to a central axis of the third sound guide segment 1013. The first sound guide channel 101*a* can be a bent structure, so that a side wall of the sound guide segment can block the dust and water vapor. In addition, a path of the first sound guide channel 101*a* is relatively long, so that most of the dust and water vapor can be deposited and attached to the side wall of each sound guide segment. Therefore, it is difficult for the dust and water vapor to reach an installation position of the first sound-emitting component 200, so that it is difficult to enable a sound outlet of the first sound-emitting component 200 to be blocked or the electronic component to be short-circuited, thereby improving the safety and reliability of the electronic device. Definitely, the second sound guide channel 101*b* may also be the foregoing bent structure, so that blocking of the sound outlet of the second sound-emitting component 300 can be prevented.

In some embodiments, when the device body 100 may include a motherboard bracket 130, the first sound guide channel 101*a* and the second sound guide channel 101*b* may be disposed on the motherboard bracket 130, and positions of the first sound guide channel 101*a* and the second sound guide channel 101*b* may be set according to a structure of the electronic device.

In some embodiments, an included angle between the central axis of the first sound guide segment 1011 and the central axis of the second sound guide segment 1012 may be 90°. In this case, the central axis of the first sound guide segment 1011 may be perpendicular to the central axis of the second sound guide segment 1012. In this case, a structure of a sound guide channel is relatively compact, so that the sound guide channel occupies less space in the device body 100.

In the foregoing embodiment, included angles may be provided among the first sound guide segment 1011, the third sound guide segment 1013, and the second sound guide segment 1012. When the second sound guide segment 1012 is made by casting, the second sound guide segment 1012 is located inside the motherboard bracket 130, and it is difficult to demold the motherboard bracket 130, resulting in a great difficulty in processing the electronic device with high costs.

In an embodiment, the device body 100 may include the motherboard bracket 130 and a display module 140. A first groove is disposed on a side of the motherboard bracket 130 facing the display module 140. The display module 140 covers a part of an opening of the first groove, the display module 140 and the first groove form the second sound guide segment 1012, a bottom of the first groove is provided with the third sound guide segment 1013, and the first sound guide segment 1011 and the third sound guide segment 1013 are located at two ends of the first groove. The first groove is open, so that the motherboard bracket 130 is easier to demold, and the display module 140 covers the opening of the first groove, thereby forming the second sound guide segment 1012. Therefore, the second sound guide segment 1012 can be processed more conveniently, so that the electronic device can be processed easily with low costs.

In another embodiment, a second groove may be disposed on a side of the motherboard bracket 130 away from the display module 140, and at least a part of the first sound-emitting component 200 may be located in the second groove. In this case, at least a part of the first sound-emitting component 200 is hidden in the second groove, so that the motherboard bracket 130 and the first sound-emitting component 200 can be stacked with a small thickness, and a thickness of the electronic device is small.

At least a part of the second sound-emitting component 300 may also be located in the second groove. At least a part of the first sound-emitting component 200 and at least a part of the second sound-emitting component 300 are both located in the second groove, so that the motherboard bracket 130, the first sound-emitting component 200, and the second sound-emitting component can be stacked with a small thickness, and a thickness of the electronic device can be further reduced, thereby improving user experience.

The motherboard bracket 130 is configured to install a motherboard 150 of the electronic device. The motherboard 150 of the electronic device is a circuit board, the motherboard 150 of the electronic device is electrically connected to the first sound-emitting component 200 and the second sound-emitting component 300, and the motherboard 150 of the electronic device controls the first sound-emitting component 200 and the second sound-emitting component 300 to emit sound.

The first sound guide segment 1011 may be disposed on the housing 110. In this case, the housing 110 needs to be processed, so that processing steps for the housing 110 are increased, and it is difficult to process the housing 110. In addition, processing the first sound guide segment 1011 on the housing 110 is likely to reduce strength of the housing 110. Therefore, in an embodiment, the device body 100 may include the housing 110 and the display module 140, the first sound-emitting component 200 may be located in space enclosed by the housing 110 and the display module 140, and an assembly gap between the display module 140 and the housing 110 forms the first sound guide segment 1011. In this case, since the assembly gap is formed between the housing 110 and the display module 140 after assembly, an ultrasonic wave can be transmitted through the assembly gap between the housing 110 and the display module 140, so that the first sound guide segment is not required to be disposed on the housing 110, the housing 110 is not required to be processed, and then the housing 110 can be processed easily. In addition, that the first sound guide segment 1011 is not required to be disposed on the housing 110 increases strength of the housing 110.

The electronic device disclosed in this embodiment of the present disclosure may be a smart phone, a tablet computer, an eBook reader, a wearable device (for example, a smart watch), a video game console, and the like. A specific type of the electronic device is not limited in this embodiment of the present disclosure.

The embodiments of the present disclosure focus on describing differences between the embodiments, and different optimization features of the embodiments may be combined to form better embodiments provided that they are not contradictory. Considering brevity, details are not described herein again.

The foregoing descriptions are merely embodiments of the present disclosure, but are not intended to limit the present disclosure. Various changes and modifications may be made to the present disclosure by those skilled in the art. Any modifications, equivalent substitutions, improvements, and the like made within the spirit and principle of the present disclosure should be included within the scope of the claims of the present disclosure.

The invention claimed is:

1. An electronic device, comprising a device body;
a first sound-emitting component; and
a second sound-emitting component, wherein:
the first sound-emitting component and the second sound-emitting component are both disposed in the device body,
the first sound-emitting component emits a first ultrasonic wave,
the second sound-emitting component emits a second ultrasonic wave,
a frequency of the first ultrasonic wave is different from a frequency of the second ultrasonic wave,
the first ultrasonic wave and the second ultrasonic wave form an audible sound wave,
a first sound guide channel and a second sound guide channel are disposed in the device body,
a first sound guide hole and a second sound guide hole are disposed at an outer surface of the device body,
the first sound-emitting component is connected to the first sound guide hole through the first sound guide channel, and
the second sound-emitting component is connected to the second sound guide hole through the second sound guide channel.

2. The electronic device according to claim 1, wherein a resonant frequency of the first sound-emitting component and a resonant frequency of the second sound-emitting component are different, wherein
a frequency of the first ultrasonic wave is the same as the resonant frequency of the first sound-emitting component; or
a frequency of the second ultrasonic wave is the same as the resonant frequency of the second sound-emitting component.

3. The electronic device according to claim 1, wherein the first sound-emitting component and the second sound-emitting component are located at the same end of the device body, and the first sound guide hole is connected to the second sound guide hole.

4. The electronic device according to claim 3, wherein a distance between the first sound-emitting component and the second sound-emitting component is less than 20 mm.

5. The electronic device according to claim 1,
wherein:
the first sound-emitting component and the second sound-emitting component are respectively located at two ends of the device body,
the first sound guide hole and the second sound guide hole are respectively disposed at the two ends of the device body, and
the first sound guide channel and the second sound guide channel are respectively disposed at the two ends of the device body.

6. The electronic device according to claim 1,
wherein:
the device body comprises a housing and a first functional module,
the first sound-emitting component and the second sound-emitting component are both disposed in the housing, and
a first assembly gap between the housing and the first functional module form the first sound guide hole or the second sound guide hole.

7. The electronic device according to claim 6,
wherein:
the first functional module comprises a light-transmitting cover plate, and
the light-transmitting cover plate and the housing enclose accommodating space,
wherein:
the first sound-emitting component and the second sound-emitting component are both located in the accommodating space, and
a second assembly gap between the housing and the light-transmitting cover plate forms the first sound guide hole or the second sound guide hole.

8. The electronic device according to claim 1,
wherein:
the first sound guide channel comprises a first sound guide segment, a second sound guide segment, and a third sound guide segment connected in sequence, and
the first sound guide segment is directly connected to the first sound guide hole,
wherein:
the first sound-emitting component is located at an end of the third sound guide segment away from the second sound guide segment,
a central axis of the first sound guide segment intersects with a central axis of the second sound guide segment, and
a central axis of the first sound guide segment is parallel to a central axis of the third sound guide segment.

9. The electronic device according to claim 8, wherein the device body comprises a motherboard bracket and a display module,
wherein: a side of the motherboard bracket facing the display module comprises a first groove,
wherein:
the display module covers a part of an opening of the first groove,
the display module and the first groove form the second sound guide segment,
a bottom of the first groove comprises the third sound guide segment, and
the first sound guide segment and the third sound guide segment are located at two ends of the first groove.

10. The electronic device according to claim 9, wherein a side of the motherboard bracket away from the display module comprises a second groove, and at least a part of the first sound-emitting component is located in the second groove.

11. The electronic device according to claim 8, wherein:

the device body comprises a housing and a display module, the first sound-emitting component is located in space enclosed by the housing and the display module, and an assembly gap between the display module and the housing form the first sound guide segment.

* * * * *